United States Patent [19]

Nakayama

[11] Patent Number: 5,909,510
[45] Date of Patent: Jun. 1, 1999

[54] METHOD AND APPARATUS FOR DOCUMENT CLASSIFICATION FROM DEGRADED IMAGES

[75] Inventor: Takehiro Nakayama, Yokohama, Japan

[73] Assignees: Xerox Corporation, Stamford, Conn.; Fuji Xerox Company, Ltd., Tokyo, Japan

[21] Appl. No.: 08/858,884

[22] Filed: May 19, 1997

[51] Int. Cl.[6] .................................................. G06K 9/72
[52] U.S. Cl. ..................... 382/229; 382/173; 382/181; 382/224; 382/227; 382/228; 382/239; 707/500; 707/530
[58] Field of Search ................................ 382/229, 239, 382/224, 228, 227, 173, 181; 707/500, 530

[56] References Cited

U.S. PATENT DOCUMENTS

| 5,375,176 | 12/1994 | Spitz . | |
|---|---|---|---|
| 5,377,280 | 12/1994 | Nakayama . | |
| 5,384,864 | 1/1995 | Spitz . | |
| 5,425,110 | 6/1995 | Spitz | 382/192 |
| 5,438,628 | 8/1995 | Spitz et al. | 382/181 |
| 5,444,797 | 8/1995 | Spitz et al. . | |
| 5,513,304 | 4/1996 | Spitz et al. . | |
| 5,526,443 | 6/1996 | Nakayama . | |
| 5,617,488 | 4/1997 | Hong et al. | 382/229 |
| 5,768,603 | 6/1998 | Brown et al. | 395/759 |
| 5,774,888 | 6/1998 | Light | 707/5 |
| 5,778,363 | 7/1998 | Light | 707/5 |
| 5,778,397 | 7/1998 | Kupiec et al. | 707/500 |

*Primary Examiner*—Leo H. Boudreau
*Assistant Examiner*—Kanji Patel
*Attorney, Agent, or Firm*—Oliff & Berridge, PLC

[57] ABSTRACT

A word shape token-based document classification system prepares a plurality of sets of training data degraded by image quality and selects the optimum training data set by examining scores from a relevance measurement. The system achieves high accuracy from a wide range of image quality.

22 Claims, 4 Drawing Sheets

| n = 1 | There are many different languages in common |
| n = 3 | There are many different languages in common |
| n = 5 | There are many different languages in common |

METHOD AND APPARATUS FOR DOCUMENT CLASSIFICATION FROM DEGRADED IMAGES

BACKGROUND OF THE INVENTION

1. Field of Invention

The present invention relates to a method and apparatus for document classification and, more particularly, to a method and apparatus for classifying a document according to language and topic.

2. Description of Related Art

Optical character recognition and the use of optical character recognition to convert scanned image data into text data suitable for processing by a digital computer is well known. In addition, methods for converting scanned image data into text data and the types of errors such methods generate are well known. However, the selection of a proper method for error correction is highly dependent upon the language of the document.

Methods for optical character recognition and for error correction in optical character recognition systems have been provided on the assumption that the language used in the document was known in advance or assumed to be in the language of the country in which the system is being used. That is, in the United States, conventional optical character recognition systems assume that the document is in English. Alternately, an optical character recognition system can be implemented with character recognition and error resolution methods for a plurality of languages.

An optical character recognition system has been developed that automatically determines the language of a document. The system generates word shape tokens from an image of the text and determines the frequency of the word shape tokens that corresponds to a set of predetermined word shape tokens. The system then converts the frequency of appearance rates to a point in a new coordinate of space and then determines which predetermined language region of the new space coordinate the point is closest to and thereby determines the language of the text. However, this system has not been able to achieve high accuracy because it does not appreciate the quality of the document image.

Another system has been developed that categorizes documents into topic categories. This system generates word shape tokens representing words appearing in the document. This system eliminates certain unimportant word shape tokens and ranks the remaining word shape tokens according to their frequency of appearance. These frequencies are then used to categorize the document as being written on a specific topic. However, this system also has not been able to achieve high accuracy because it also does not appreciate the quality of the document image.

Therefore, it has not been possible to achieve high accuracy in topic or language categorization of documents because of the wide range of document image quality.

SUMMARY OF THE INVENTION

The present invention is a word shape token-based document classification system that achieves high accuracy across a wide range of image quality. The system prepares a plurality of sets of training data that have been degraded by image quality. The system selects the optimum training data set by examining scores from a relevance measurement. The system consists of three main portions: word shape token generation, language classification and topic classification.

BRIEF DESCRIPTION OF THE DRAWINGS

The invention is described in relation to the accompanying drawings, in which.

DETAILED DESCRIPTION OF PREFERRED EMBODIMENTS

Figure 1:
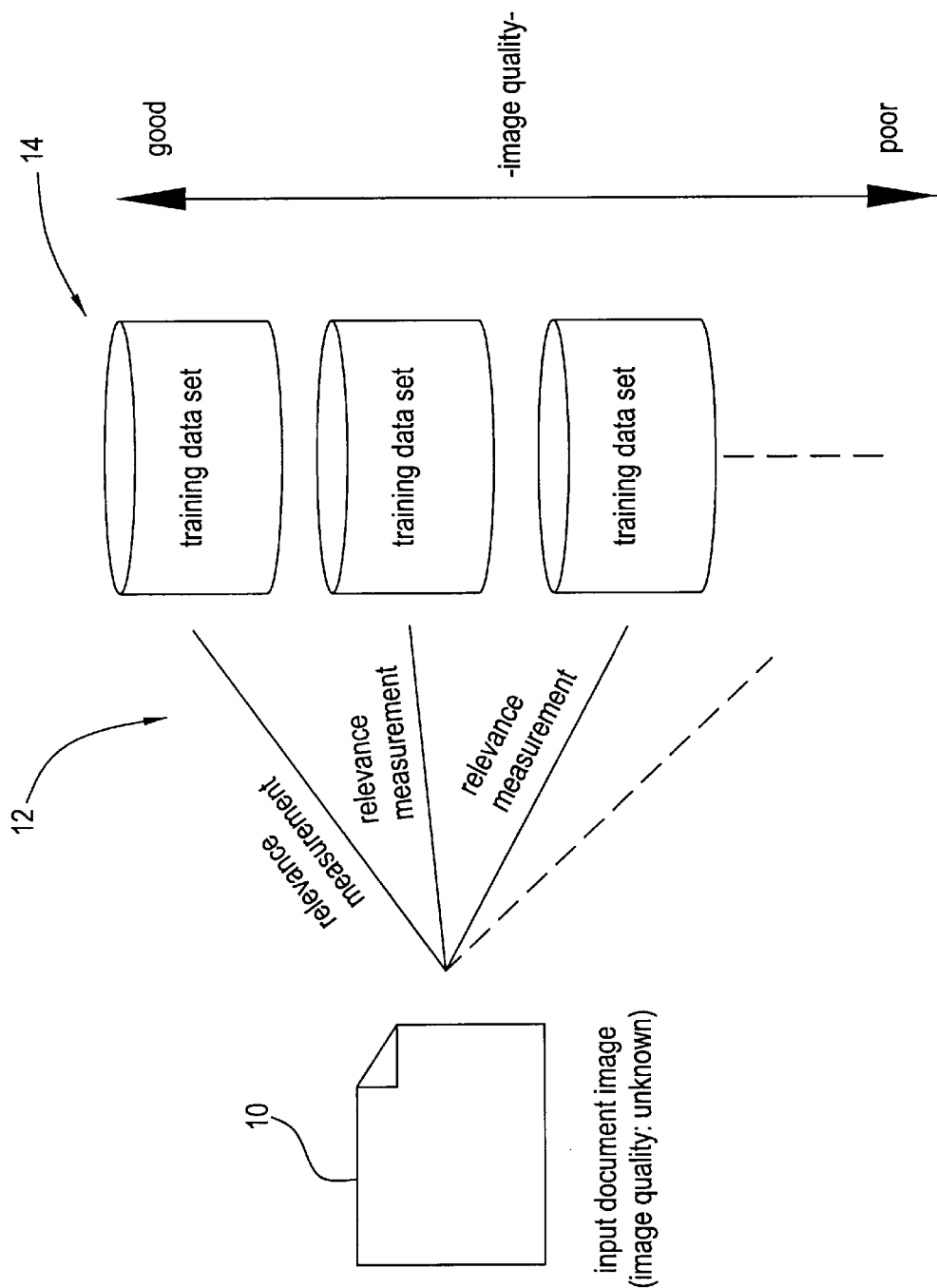
FIG. 1 is a block diagram of training data set selection by relevance measurement of the present invention.

As shown in FIG. 1, the system of the present invention receives as input a document image 10 of unknown quality. The system then performs a relevance measurement 12 to determine which of a plurality of training data sets 14 will provide the most accurate classification of the document. The plurality of training data sets 14 vary in image quality.

Figure 2:
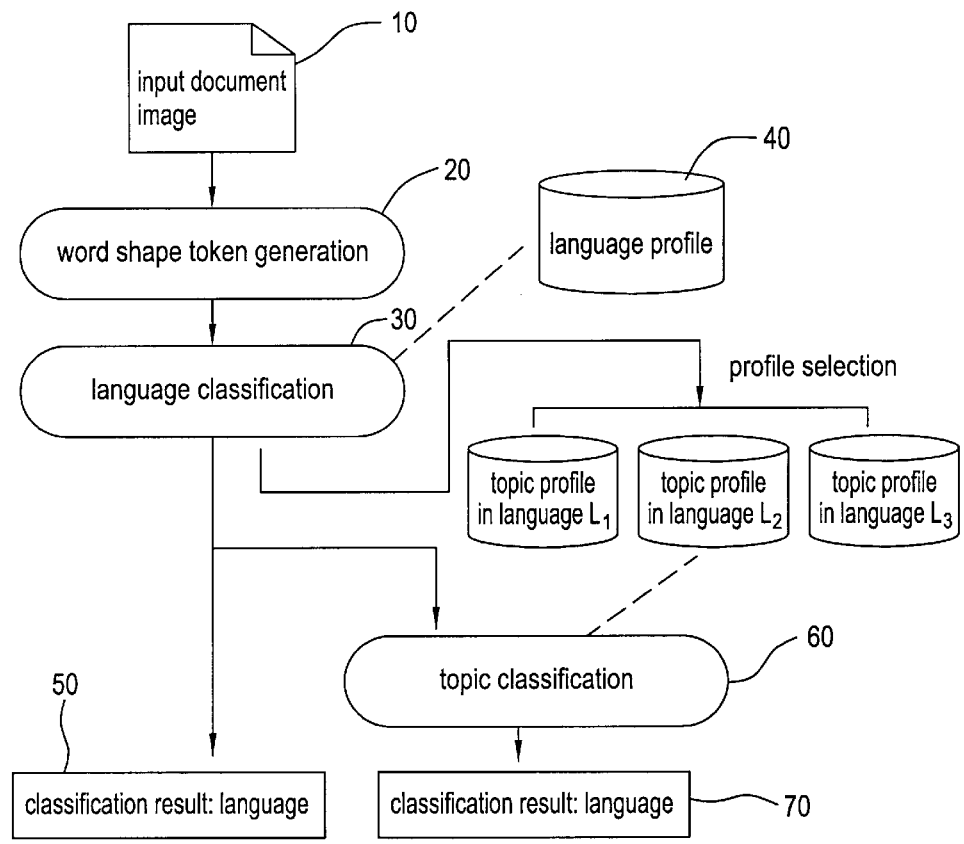
FIG. 2 is a flow chart of the topic and language classification system of the present invention.

In FIG. 2, a flow chart shows one method of language and topic classification as performed by the system of the present invention. The document image 10 is derived from a scanner or other conventional input device. Word shape tokens are then generated at step 20. These word shape tokens may be generated by a conventional system, such as described in U.S. Pat. No. 5,375,176, issued Dec. 20, 1994, assigned to the same assignee as the present invention and incorporated herein by reference.

The system then performs language classification at step 30 using the relevance measurement described below along with a conventional language classification system, such as described in U.S. Pat. No. 5,377,280, issued Dec. 27, 1994, assigned to the same assignee as the present invention and incorporated herein by reference. The present invention utilizes the language classification system after it determines the most relevant language profile 40. A language classification result 50 is then output.

The result of the language classification 30 may then be used to perform topic classification 60. The topic classification utilizes the relevance measurement system described below along with a conventional topic classification system, such as described in U.S. Pat. No. 5,526,443, assigned to the same assignee as the present invention and incorporated herein by reference. The system then generates a topic classification result 70.

The present invention may be implemented with a conventional general purpose digital computer. It is of course understood that a special purpose digital computer or hard wired logic circuit can be used in place of a general purpose digital computer.

Figure 3:
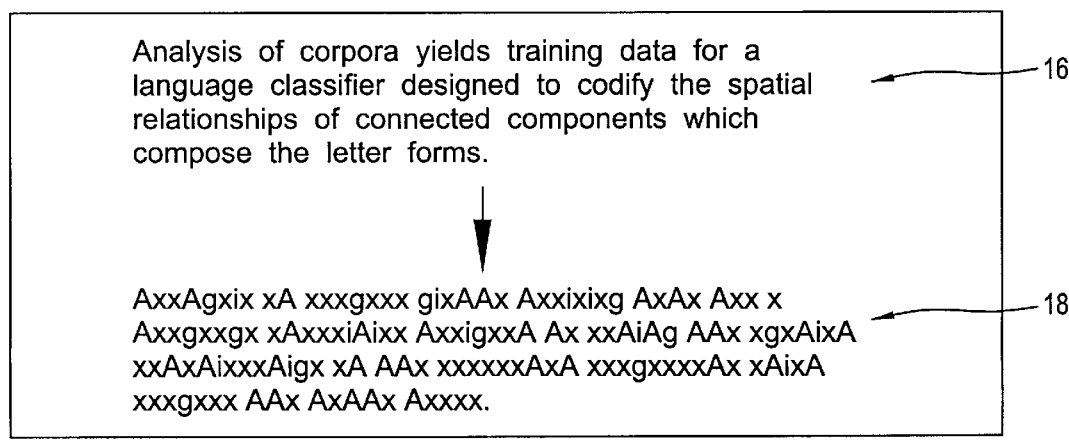
FIG. 3 shows the abstract coded character classes or character shape codes and the derived word shape tokens and their correspondence to the actual text portion of a document.

FIG. 3 shows the text portion 16 of a document image prior to conversion and the word shape tokens 18 after conversion using the coding scheme disclosed, for example, in U.S. Pat. No. 5,375,176.

Figures 4, 6:
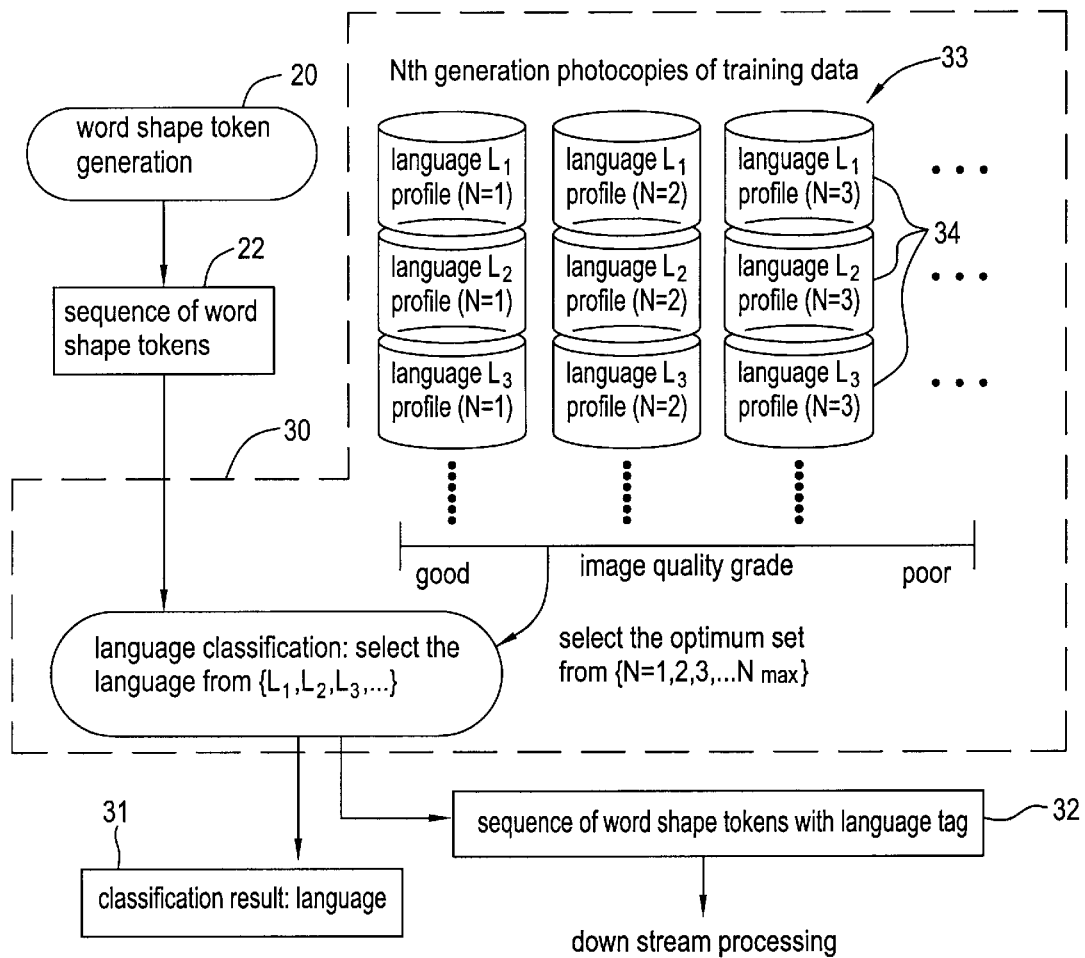
FIG. 4 is a block diagram of the language classification section of the present invention.
FIG. 6 is a block diagram showing three degrees of degradation of a document image.

Looking now to FIG. 4, the word shape token generator 20 prepares a sequence of word shape tokens 22 that represent words in the document. The language classification system 30 uses this sequence of word shape tokens 22 to classify the input document as being written in a specific language and also may forward the sequence of word shape tokens along with a language tag 32 that identifies the language in which the input document is written.

The language classification system prepares plural sets of language training data 33. Each language training data set comprises a plurality of language profiles 34. At least one of the language training data sets is degraded in image quality.

Using the sequence of word shape tokens 22, the system computes the relative frequencies of each word shape token in the document to compare them with the relative frequencies in the language training data sets. The system uses a statistical method (e.g., linear discriminate analysis, vector space model, and so forth) that gives scores that indicate the degree of relevance of the input sequence to each language training data set.

In a first preferred embodiment, the system merges all the language profiles in each language training data set, computes the relative frequencies of word shape tokens for each merged language profiles and the input document, compares these relative frequencies using a statistical method, and uses the language training data set having the most relevant merged language profiles. The language is then determined using the selected language training data set in a conventional manner.

In a second embodiment, the conventional language classification is performed on all language training data sets. A score indicating the degree of similarity between the relative frequencies of the word shape tokens of the language profile to the document is calculated. The highest score is selected and the document is classified as being written in the language corresponding to the language profile with the highest score.

In a third embodiment, the system first performs conventional language classification across all language training data sets. The relative frequencies of word shape tokens for all language profiles and for the document are computed. Then a score indicating the degree of similarity of the relative frequencies for each language profile to those of the document is calculated. Then for each language training data set a proportion of the highest score over the second highest score is computed. The language training data set having the highest proportion is selected and the language profile having the highest score within the selected language training data set is determined to be written in the language in which the input document is written.

Figure 5:
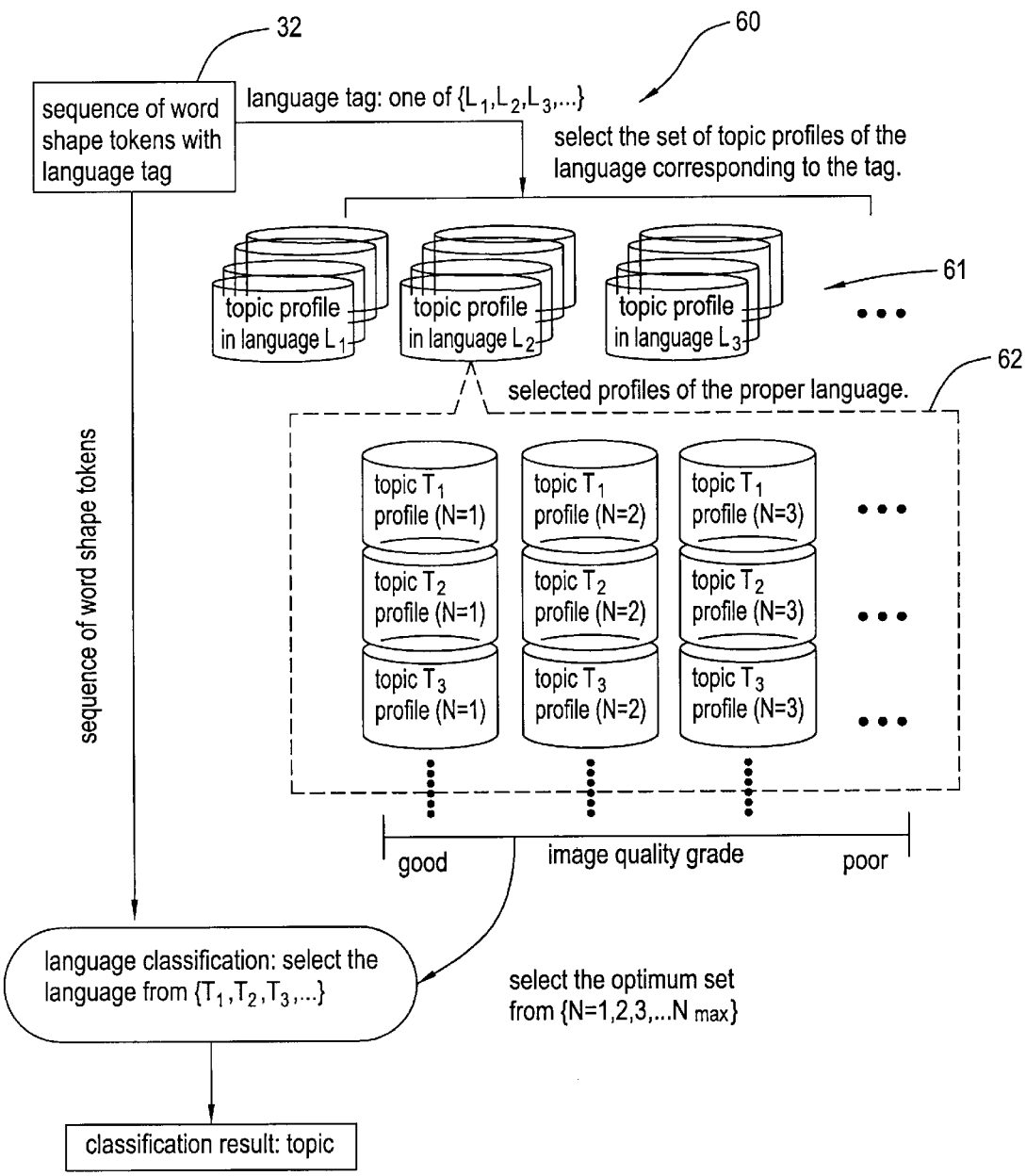
FIG. 5 is a block diagram of the topic classification section of the present invention.

Referring back now to FIG. 2, after the language classification 30 has been performed, the system may continue processing to determine the topic about which the document is written, at step 60. FIG. 5 shows a block diagram indicating the processing performed by the system in classifying the document by step 60. The system prepares topic training data sets 61 derived from a topic reference data set in several different languages. Within each language at least one topic training data set is derived from a degraded image of the topic reference data set. The system then uses the language tag 32 to identify a plurality of topic training data sets 62 that are written in the language indicated by the language tag. The system then processes the identified plurality of topic training data sets 62 according to one of the following embodiments.

In a first embodiment, all topic profiles in each identified topic training data set are merged. Then the relative frequencies of stop tokens are computed for each merged topic profile and the document. The system then uses a statistical method to compare the relative frequencies and select the merged topic training data set having relative frequencies of stop tokens that are the most similar to the document to select one of the identified topic training data sets. The selected topic training data set is then used for conventional topic classification as disclosed in U.S. Pat. No. 5,526,443, for example.

In an alternative embodiment, conventional topic classification is performed on each of the plurality of identified topic training data sets. The relative frequencies of stop tokens for each topic profile in the identified topic training data sets and the document are calculated and a score is also calculated that indicates the degree of similarity between the relative frequencies of each topic profile and the document. The topic profile having the highest score is selected and the document is then classified as being written on the topic of the selected topic profile.

An alternative to this embodiment first uses the calculated scores to calculate a proportion for each identified topic training data set. The proportion is the highest score divided by the second highest score. The topic training data set having the highest proportion is then selected and the topic profile within the selected topic training data set is selected as indicating the topic on which the document is written.

In a further embodiment, the identified topic training data set is selected based upon knowledge gained about the quality of the document image during the language classification stage. During the language classification stage, a language training data set derived from a language reference data set having a certain image degradation is identified. In the topic classification stage the identified topic training data set derived from a topic reference data set having a similarly degraded image is selected and is used to classify the document in a conventional manner.

In a preferred embodiment of the present invention, the relevance measurement relies upon the relative frequencies of word shape tokens to generate a document profile. The document profile $D_i$ is represented as a vector of numeric weights, $D_i=(W_{i1}, W_{i2}, \ldots, W_{ik}, \ldots, W_{it})$, where $W_{ik}$ is the weight given the kth word shape token in the ith document, and t is the number of distinct word shape tokens in the ith document. The weight is a number between 0 and 1 and indicates the frequency of the word shape token relative to other word shape tokens. The system then measures the degree of similarity between two document profiles using a cosine function to compute the similarity between two documents, $D_i$ and $D_j$:

$$sim(D_i, D_j) = \frac{\sum_{k=1}^{t}(w_{ik} \cdot w_{jk})}{\sqrt{\sum_{k=1}^{t}(w_{ij})^2 \cdot \sum_{k=1}^{t}(w_{jk})^2}}$$

This equation generates a score that indicates the degree of similarity between the documents $D_i$ and $D_j$. The larger the value the greater the similarity between the two documents.

Stop tokens are used in the topic classification process rather than all word shape tokens because of the increased accuracy demonstrated by empirical results. In one particular experiment, the Applicant used the five most common word shape tokens as stop tokens and also evaluated the topic classification system using all word shape tokens. In the latter method, 349 of 600 images were assigned to the appropriate topic training profile, while in the former method 497 of 600 images were correctly assigned to the appropriate topic training profile, thereby showing an improvement in the accuracy of topic classification through the use of stop tokens.

Accuracy may also be improved with careful selection of stop tokens. By selecting a small number of stop tokens the system will perform the necessary computations much more quickly because the vector dimension is very limited. In the above described experiment, five dimensional vectors were used with the five stop tokens and about 18,000 dimensional vectors were used in the other method.

While this invention has been described with the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A method for classifying a document using a sequence of word tokens representing words in the document, the word tokens comprising character shape code classes, each word of the document being represented by only one word token, and a plurality of language training data sets, each language training data set derived from an image of language reference data and comprising a plurality of language profiles, the method comprising the steps:

merging, for each of the plurality of language training data sets, the language profiles of that language training data set to form a merged language profile;

determining the relative frequencies of word shape tokens for each merged language profile and the document;

selecting the language training data set corresponding to the merged language profile having relative frequencies that are the most similar to the relative frequencies of the document;

determining the relative frequencies of word shape tokens for each language profile in the selected language training data set;

selecting the language profile having relative frequencies that are the most similar to the document; and classifying the document as being composed in the language of the selected language profile, wherein at least one of the language training data sets is derived from a degraded image of the language reference data.

2. The method of claim 1, further comprising the steps of:

after selecting the language profile, generating a language tag indicative of the language of the selected language profile;

identifying a plurality of topic training data sets derived from a topic reference data set and composed in the language indicated by the language tag, wherein at least one of the topic training data sets is derived from a degraded image of the topic reference data set, the topic reference data set comprising topic profiles;

merging, for each of the identified topic training data sets, the topic profiles of that language training data set to form a merged topic profile;

determining the relative frequencies of stop tokens in each of the merged topic profiles and the document;

selecting the identified topic training data set corresponding to the merged topic profiles having relative frequencies that are the most similar to the relative frequencies of the document; and classifying the document as being composed on a topic using the selected identified topic training data set.

3. The method of claim 1, further comprising the steps of:

after selecting the language profile, generating a language tag indicative of the language of the selected language profile;

identifying a plurality of topic training data sets derived from a topic reference data set and composed in the language indicated by the language tag, wherein at least one of the topic training data sets is derived from a degraded image of the topic reference data set, the topic reference data set comprising topic profiles;

determining the relative frequencies of stop tokens for each topic profile in the identified topic training data set and the document;

determining a topic score for each identified topic profile based upon the degree of similarity between the relative frequencies of each topic profile and the document;

selecting the topic profile having the highest topic score; and classifying the document as being composed on the topic of the selected topic profile.

4. The method of claim 3, further comprising the steps of:

after determining the topic scores, determining a topic proportion for each identified topic training data set, the topic proportion being the highest topic score divided by the second highest topic score; and selecting the topic training data set with the highest topic proportion, wherein the selected topic profile is selected from the selected topic training data set.

5. The method of claim 1, further comprising the steps of:

after selecting the language profile, generating a language tag indicative of the language of the determined language profile;

identifying a plurality of topic training data sets derived from a topic reference data set and composed in the language indicated by the language tag, wherein at least one of the topic training data sets is derived from a degraded image of the topic reference data set, the topic reference data set comprising topic profiles;

selecting the identified topic training data set that was derived from an image of the topic reference data that was degraded to the same degree as the image of the language reference data set from which the selected language training data set was derived; and classifying the document as being composed on a topic using the selected topic training data set.

6. A method for classifying a document using a sequence of word tokens representing words in the document, the word tokens comprising character shape code classes, each word of the document being represented by only one word token, and a plurality of language training data sets, each language training data set derived from an image of language reference data and comprising a plurality of language profiles, the method comprising the steps of;

determining the relative frequencies of word shape tokens for each language profile in each language training data set and the document;

determining a language score for each language profile based upon the degree of similarity between the relative frequencies of each language profile and the document;

selecting the language profile having the highest language score; and classifying the document as being composed in the language of the selected language profile, wherein at least one of the language training data sets is derived from a degraded image of the language reference data set.

7. The method of claim 6, further comprising the steps of:

after selecting the language profile, generating a language tag indicative of the language of the selected language profile;

identifying a plurality of topic training data sets derived from a topic reference data set and composed in the language indicated by the language tag, wherein at least one of the topic training data sets is derived from a degraded image of the topic reference data set, the topic reference data set comprising topic profiles;

merging the topic profiles within each of the identified topic training data sets to form a merged topic profile for each identified topic training data set;

determining the relative frequencies of stop tokens in each of the merged topic profiles and the document;

selecting the identified topic training data set having relative frequencies that are the most similar to the relative frequencies of the document; and classifying the document as being composed on a topic using the selected topic training data set.

8. The method of claim 6, further comprising the steps of:

after selecting the language profile, generating a language tag indicative of the language of the selected language profile;

identifying a plurality of topic training data sets derived from a topic reference data set and composed in the language indicated by the language tag, wherein at least one of the topic training data sets is derived from a degraded image of the topic reference data set, the topic reference data set comprising topic profiles;

determining the relative frequencies of stop tokens for each topic profile in the identified topic training data set and the document;

determining a topic score for each identified topic profile based upon the degree of similarity between the relative frequencies of each topic profile and the document;

selecting the topic profile having the highest topic score; and classifying the document as being composed on the topic of the selected topic profile.

9. The method of claim 8, further comprising the steps of:

after determining the topic scores, determining a topic proportion for each identified topic training data set, the topic proportion being the highest topic score divided by the second highest topic score within that identified topic training data set; and selecting the topic training data set with the highest topic proportion, wherein the selected topic profile is selected from the selected topic training data set.

10. The method of claim 6, further comprising the steps of:

after selecting the language profile, generating a language tag indicative of the language of the selected language profile;

identifying a plurality of topic training data sets derived from a topic reference data set and composed in the language indicated by the language tag, wherein at least one of the topic training data sets is derived from a degraded image of the topic reference data set, the topic reference data set comprising topic profiles;

selecting the identified topic training data set that was derived from an image of the topic reference data that was degraded to the same degree as the image of the language reference data set from which the selected language training data set was derived; and classifying the document as being composed on a topic using the selected topic training data set.

11. The method of claim 6 further comprising:

after determining the language scores, determining a language proportion for each language training data set, the language proportion being the highest language score divided by the second highest language score within that language training data set; and selecting the language training data set with the highest language proportion, wherein the selected language profile is selected from the selected language training data set.

12. An apparatus for classifying a document using a sequence of word tokens representing words in the document, the word tokens comprising character shape code classes, each word of the document being represented by only one word token, and a plurality of language training data sets, each language training data set derived from an image of language reference data and comprising a plurality of language profiles, the apparatus comprising:

a language profile merging circuit that merges all language profiles in each of the plurality of language training data sets to form a merged language profile for each language training data set;

a first word shape token relative frequency determining circuit that determines the relative frequencies of word shape tokens for each merged language profile and the document;

a language training data set selector that selects a language training data set corresponding to the merged language profile having relative frequencies that are the most similar to the relative frequencies of the document;

a second word shape token relative frequency determining circuit that determines the relative frequencies of word shape tokens for each language profile in the selected language training set;

a language profile selector that selects the language profile having relative frequencies that are the most similar to the document; and a document language classifier that classifies the document as being composed in the language of the selected language profile, wherein at least one of the language training data sets is derived from a degraded image of the language reference data set.

13. The apparatus of claim 12, further comprising:

a language tag generator that generates a language tag indicative of the language of the selected language profile;

a topic training data set identifier that identifies a plurality of topic training data sets derived from a topic reference data set and composed in the language indicated by the language tag, wherein at least one of the topic training data sets is derived from a degraded image of the topic reference data set, the topic reference data set comprising topic profiles;

a topic profile merging circuit that merges the topic profiles within each of the identified topic training data sets to form a merged topic profile for each identified topic training data set;

a stop token relative frequency determining circuit that determines the relative frequencies of stop tokens in each of the merged topic profiles and the document;

an identified topic training data selector that selects the identified topic training data set corresponding to the merged topic profile having relative frequencies that are the most similar to the relative frequencies of the document; and a document topic classifier that classifies the document as being composed on a topic corresponding to the selected topic training data set.

14. The apparatus of claim 12, further comprising:

a language tag generator that generates a language tag indicative of the language of the selected language profile;

a topic training data set identifier that identifies a plurality of topic training data sets derived from a topic reference data set and composed in the language indicated by the language tag, wherein at least one of the topic training sets is derived from a degraded image of the topic reference data set, the topic reference data set comprising topic profiles;

a stop token relative frequency determining circuit that determines the relative frequencies of stop tokens for each topic profile in the identified topic training data set and the document;

a topic score determining circuit that determines a topic score for each identified topic profile based upon the degree of similarity between the relative frequencies of each topic profile and the document;

a topic profile selector that selects the topic profile having the highest topic score; and a document topic classifier that classifies the document as being composed on the topic of the selected topic profile.

15. The apparatus of claim 14, further comprising:

a topic proportion determiner that determines a topic proportion for each identified topic training data set, the topic proportion being the highest topic score divided by the second highest topic score; and a topic training data set selector that selects the topic training data set with the highest topic proportion, wherein the selected topic profile is selected from the selected topic training data set.

16. The apparatus of claim 12, further comprising:

a language tag generator that generates a language tag indicative of the language of the selected language profile;

a topic training data set identifier that identifies a plurality of topic training data sets derived from a topic reference data set and composed in the language indicated by the language tag, wherein at least one of the topic training data sets is derived from a degraded image of the topic reference set, the topic reference data set comprising topic profiles;

an identified topic training data set selector that selects the identified topic training data set that was derived from an image of the topic reference data that was degraded to the same degree as the image of the language reference data set from which the selected language training set was derived; and a document topic classifier that classifies the document as being composed on a topic using the selected topic training data set.

17. An apparatus for classifying a document using a sequence of word tokens representing words in the document, the word tokens comprising character shape code classes, each word of the document being represented by only one word token, and a plurality of language training data sets, each language training data set derived from an image of language reference data and comprising a plurality of language profiles, the apparatus comprising:

a word shape token relative frequency determining circuit that determines the relative frequencies of word shape tokens for each language profile in each language training set and the document;

a language score determining circuit that determines a language score for each language profile based upon the degree of similarity between the relative frequencies of each language profile and the document;

a language profile selecting circuit that selects the language profile having the highest language score; and a document language classifying circuit that classifies the document as being composed in the language of the selected language profile, wherein at least one of the language training data sets is derived from a degraded image of the language reference data set.

18. The apparatus of claim 17, further comprising:

a language tag generating circuit that generates a language tag indicative of the language of the selected language profile;

a topic training data set identifying circuit that identifies a plurality of topic training data sets derived from a topic reference data set and composed in the language indicated by the language tag, wherein at least one of the topic training data sets is derived from a degraded image of the topic reference data set, the topic reference data set comprising topic profiles;

a topic profile merging circuit that merges the topic profiles within each of the identified topic training data sets to form a merged topic profile for each identified topic training data set;

a stop token relative frequency determining circuit that determines the relative frequencies of stop tokens in each of the merged topic profiles and the document;

an identified topic training data selecting circuit that selects the identified topic training data set having relative frequencies that are the most similar to the relative frequencies of the document; and a document topic classifying circuit that classifies the document as being composed on a topic using the selected topic training data set.

19. The apparatus of claim 17, further comprising:

a language tag generating circuit that generates a language tag indicative of the language of the selected language profile; a topic training data set identifying circuit that identifies a plurality of topic training data sets derived from a topic reference data set and composed in the language indicated by the language tag, wherein at least one of the topic training sets is derived from a degraded image of the topic reference data set, the topic reference data set comprising topic profiles;

a stop token relative frequency determining circuit that determines the relative frequencies of stop tokens for each topic profile in the identified topic training data set and the document;

a topic score determining circuit that determines a topic score for each identified topic profile based upon the degree of similarity between the relative frequencies of each topic profile and the document;

a topic profile selecting circuit that selects the topic profile having the highest topic score; and a document topic classifying circuit that classifies the document as being composed on the topic of the selected topic profile.

20. The apparatus of claim 19, further comprising:

a topic proportion determining circuit that determines a topic proportion for each identified topic training data set, the topic proportion being the highest topic score divided by the second highest topic score; and a topic training data set selecting circuit that selects the topic training data set with the highest topic proportion, wherein the selected topic profile is selected from the selected topic training data set.

21. The apparatus of claim 17, further comprising:

a language tag generating circuit that generates a language tag indicative of the language of the selected language profile;

a topic training data set identifying circuit that identifies a plurality of topic training data sets derived from a topic reference data set and composed in the language indicated by the language tag, wherein at least one of the topic training data sets is derived from a degraded image of the topic reference set, the topic reference data set comprising topic profiles;

an identified topic training data set selecting circuit that selects the identified topic training data set that was derived from an image of the topic reference data that was degraded to the same degree as the image of the language reference data set from which the selected language training set was derived; and a document topic classifying circuit that classifies the document as being composed on a topic using the selected topic training data set.

22. The apparatus of claim 17, further comprising:

a language proportion determining circuit that determines a language proportion for each language training data set, the language proportion being the highest language score divided by the second highest language score; and a language training data set selecting circuit that selects the language training data set with the highest language proportion, wherein the selected language profile is selected from the selected language data set.

* * * * *